(12) United States Patent
McIntyre et al.

(10) Patent No.: US 8,028,246 B2
(45) Date of Patent: Sep. 27, 2011

(54) CONCIERGE—SHOPPING ASSISTANT

(75) Inventors: Dale F. McIntyre, Honeoye Falls, NY (US); Kevin M. Gobeyn, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 604 days.

(21) Appl. No.: 12/195,668

(22) Filed: Aug. 21, 2008

(65) Prior Publication Data
US 2010/0050107 A1 Feb. 25, 2010

(51) Int. Cl.
*G06F 3/048* (2006.01)
*G06F 7/00* (2006.01)
*G06Q 30/00* (2006.01)
*G06Q 10/00* (2006.01)
*G06K 9/00* (2006.01)

(52) U.S. Cl. ...... 715/777; 715/838; 705/26.1; 705/27.1; 382/325; 707/705

(58) Field of Classification Search ................ 715/777, 715/838; 707/705, 736; 705/26.1, 27.1; 382/115, 305, 325
See application file for complete search history.

(56) References Cited

U.S. PATENT DOCUMENTS

| | | | |
|---|---|---|---|
| 5,442,795 A * | 8/1995 | Levine et al. | 715/775 |
| 7,047,041 B2 | 5/2006 | Vaenskae et al. | |
| 7,110,575 B2 | 9/2006 | Chen et al. | |
| 7,142,697 B2 | 11/2006 | Huang et al. | |
| 7,218,759 B1 | 5/2007 | Ho et al. | |
| 7,437,681 B2 * | 10/2008 | Misawa et al. | 715/835 |
| 7,439,991 B1 * | 10/2008 | Taima et al. | 345/670 |
| 7,496,859 B2 * | 2/2009 | Watanabe | 715/838 |
| 7,783,135 B2 | 8/2010 | Gokturk et al. | |
| 2003/0076322 A1 * | 4/2003 | Ouzts et al. | 345/440 |
| 2007/0276768 A1 | 11/2007 | Pallante | |

* cited by examiner

*Primary Examiner* — Ting Lee
(74) *Attorney, Agent, or Firm* — Justin D. Petruzzelli; Christopher J. White

(57) ABSTRACT

A method for providing access to information related to a digital image record on a data processing device. The digital image record is displayed with a tab emanating from an edge of the digital image record. The tab includes an access point that allows a user to access a category of information related to content contained within the digital image record.

31 Claims, 8 Drawing Sheets

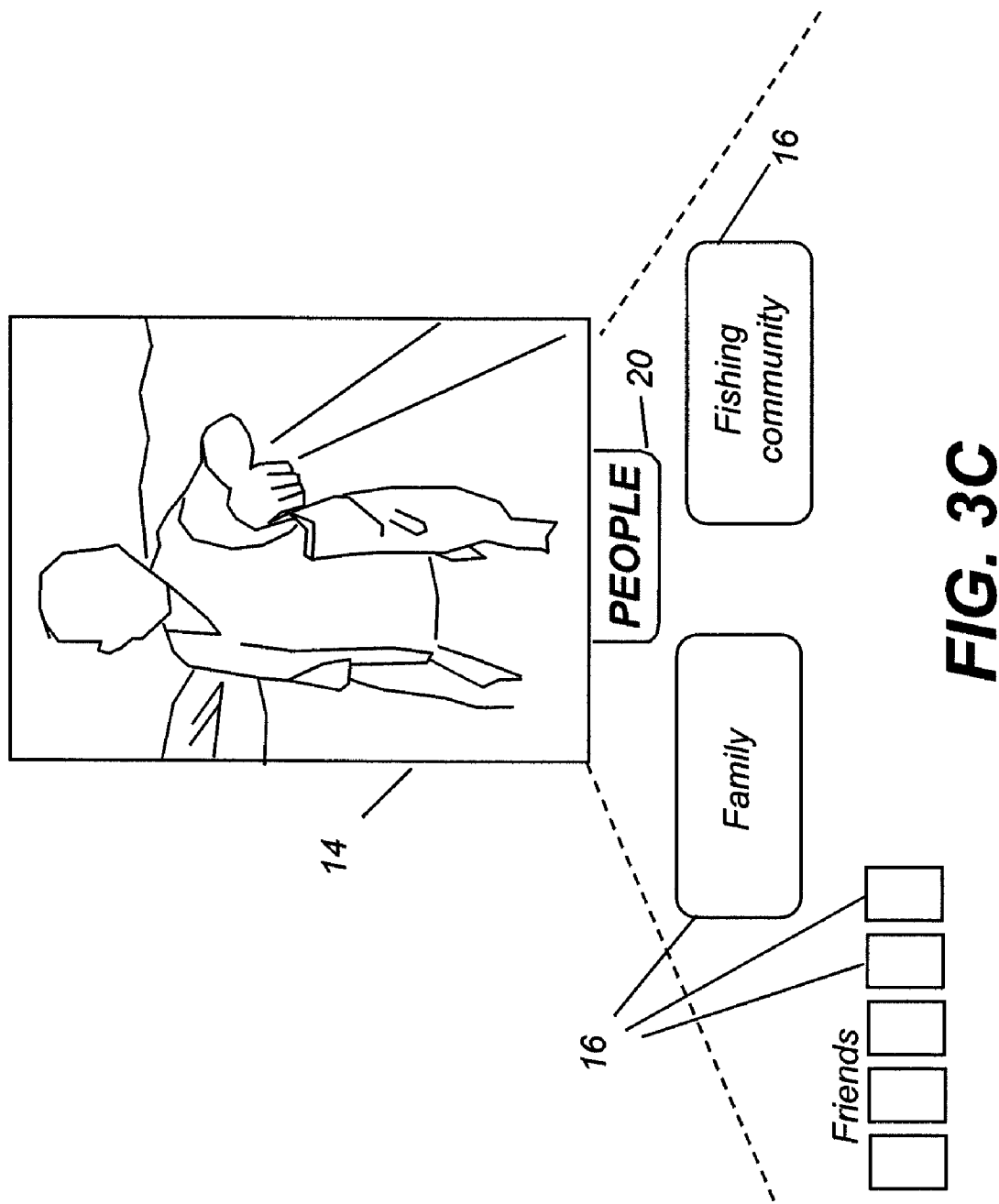

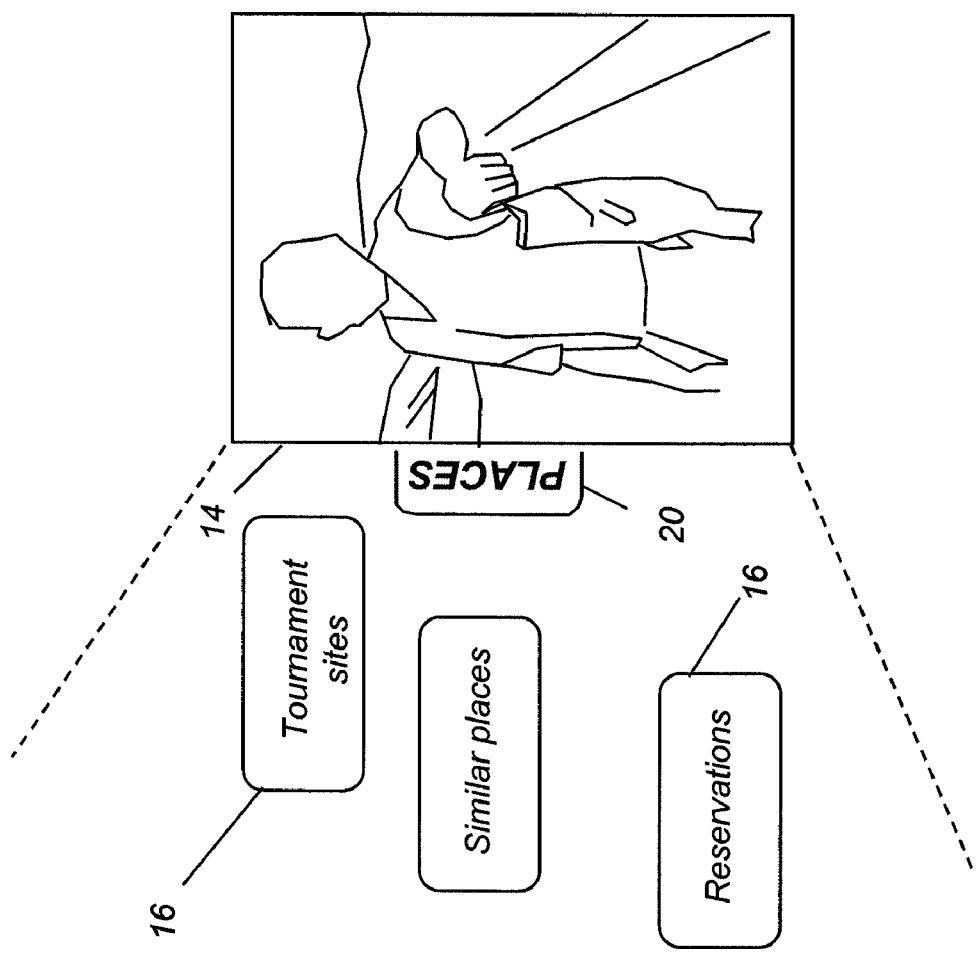

CONCIERGE—SHOPPING ASSISTANT

CROSS REFERENCE TO RELATED APPLICATIONS

Reference is made to commonly assigned, co-pending U.S. patent application Ser. No. 12/195,754 (Publication No. 2010/0049585) by Dale F. MCKINTYRE and Kevin M. GOBEYN filed Aug. 21, 2008 entitled "CONCIERGE—SHOPPING WIDGET—METHOD FOR USER MANAGED PROFILE AND SELECTIVE TRANSMISSION THEREOF", the disclosure of which is incorporated herein by reference.

FIELD OF THE INVENTION

This invention generally relates to using information from digital image records associated with a user and providing graphical user interface utilities for access to related digital content.

BACKGROUND OF THE INVENTION

An increasing number of people are taking advantage of on-line access to and storage of digital records collections, such as digital image collections. By using any of a number of various tools that allow access to images and other records on-line, a user has enhanced opportunities for enjoying, sharing, and using images.

One advantage of digital image storage relates to the amount of information that can be stored in and be associated with the digital image data. This information includes increasing amounts of metadata that are being made available with digital image records obtained from today's digital cameras. For example, digital image records currently obtained from a digital camera often have accompanying metadata that describes date, time, and location of images captured, such as from GPS data obtained by the camera. This information can also include conditions under which the image was obtained and photographer identification, and can even have various data about the image content itself. Standard information data fields or "tags" that can accompany a digital image record are defined, for example, in the Digital Still Camera Image File Format Standard, also termed the EXchangeable Image File or EXIF Standard, v.2.1, from the Japan Electronic Industry Development Association (JEIDA) CP-3451.

Semantic information that can be obtained as metadata for a digital image record can include various information obtained from objects in the image, including data from image analysis tools known in the art, such as various software applications providing scene analysis, object detection and recognition, or face detection and recognition. It has been recognized that this capability to extract semantic information can be useful, for example, in targeted marketing. This capability allows a retailer to present products that may have special appeal to an audience that has effectively been "pre-screened" according to images that are owned and viewed by individual members of that audience. That is, targeted marketing aims to identify and reach "pre-screened" consumers who are likely to have a high level of interest in specific products and services. Image analysis tools provide another way for marketers of products and services to perform effective pre-screening and to respond to customer interests in a more accurate manner than might otherwise be available using other marketing tools.

In a more general sense, the capability to extract content information from within and metadata associated with a digital image record can help to enhance a user's overall enjoyment of digital images. By obtaining information related to images, a computer application can make some reasonable inferences about the user and can use these inferences to offer other opportunities to the user for functions that access related digital content. This can include a range of opportunities for increased viewing enjoyment, enhanced social interaction, and enhanced marketing for items or services that are of particular interest.

Conventional methods for targeted marketing and for access to related digital content do not provide ways to offer enhanced opportunities that adapt readily to different image content and allow only a minimum of user interaction with image content. Accordingly, there is an ongoing need for additional or improved techniques for providing user access to digital content that is related to a viewed image.

SUMMARY OF THE INVENTION

According to some embodiments, the present invention provides a method for providing access to information related to a digital image record, the method including the steps of: instructing presentation of the digital image record on a display; and instructing presentation of a tab on the display, the tab appearing near or emanating from an edge of the displayed digital image record or from an edge of a digital image record container including the digital image record, wherein the tab is an access point configured to allow a user to access a category of information related to content contained within the digital image record.

One type of category of information for user access may be shopping information from a particular product or service provider. The shopping information can be associated with a particular product or service provider, and the shopping information may indicate products or services related to the content contained within the digital image record and offered by the particular product or service provider.

Embodiments of the present invention may further comprise receiving an indication of user-interaction with the displayed digital content record, wherein the receiving step occurs prior to the step of instructing presentation of the tab, and wherein the step of instructing presentation of the tab occurs in response to the receiving step. The user-interaction could be a mouse hovering over the displayed digital image record, for example.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which:

FIGS. 3A, 3B, 3C, 3D, and 3E show examples of embodiments in which tabs emanating from a displayed image allow access to information related to image content.

DETAILED DESCRIPTION OF THE INVENTION

Embodiments of the present invention provide access to information related to a digital image record based at least upon an analysis of image content from a digital image record that is associated with a user and displayed to the user. Analyzing image content from digital image records provides valuable information about a user. Consequently, such information may advantageously be used for targeted marketing or for other functions that enhance the user's viewing experience.

The phrase "digital image record," as used herein, includes digital still images as well as digital video. Also, it should be noted that, unless otherwise explicitly noted or required by context, the word "or" is used in this disclosure in a non-exclusive sense. In addition, functions described herein may be implemented as "software" or "software programs". Those skilled in the art will recognize, however, that the equivalent functions of such software can also be readily executed in hardware.

Figure 1:
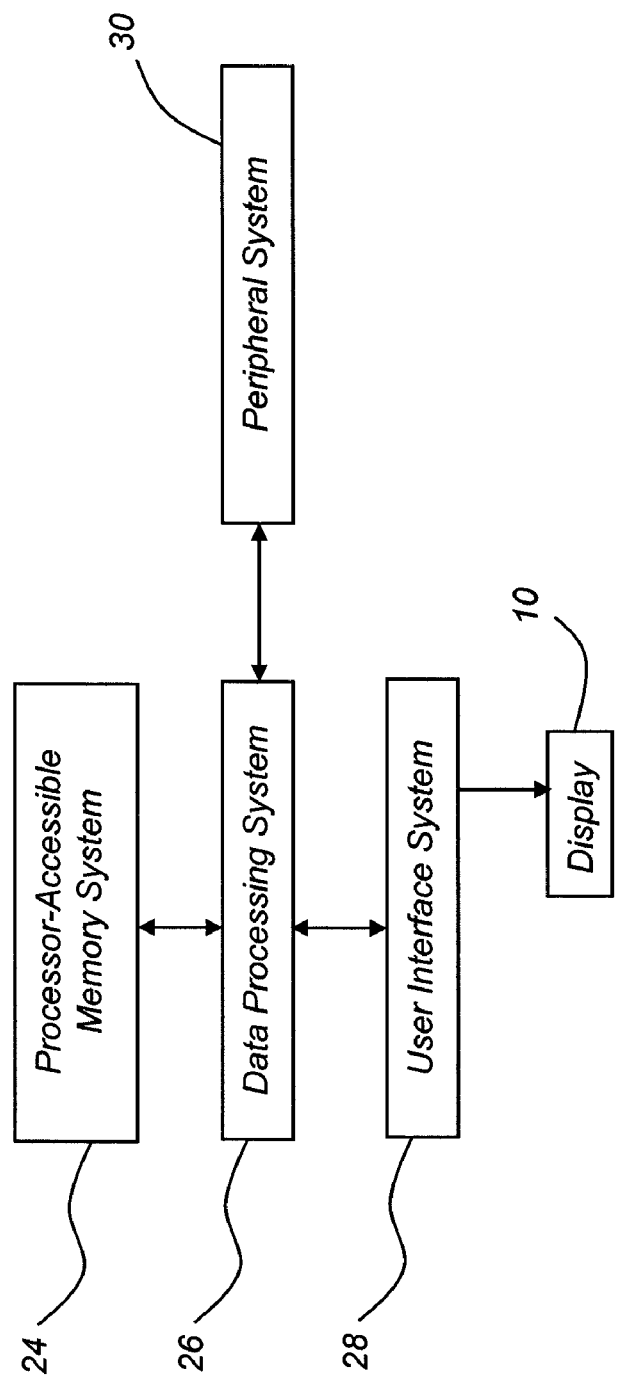
FIG. 1 illustrates a system for providing access to information related to a digital image record according to an embodiment of the present invention.

FIG. 1 illustrates a system 22 for providing access to information related to a digital image record, according to an embodiment of the present invention. The system 22 includes a data processing system 26, a peripheral system 30, a user interface system 28, and a processor-accessible memory system 24. The processor-accessible memory system 24, the peripheral system 30, and the user interface system 28 are communicatively connected to the data processing system 26. The data processing system 26 includes one or more data processing devices that implement the processes of the various embodiments of the present invention, including the example processes of FIG. 2 described herein.

The phrases "data processing device" or "data processor," as used herein, include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Figure 2:
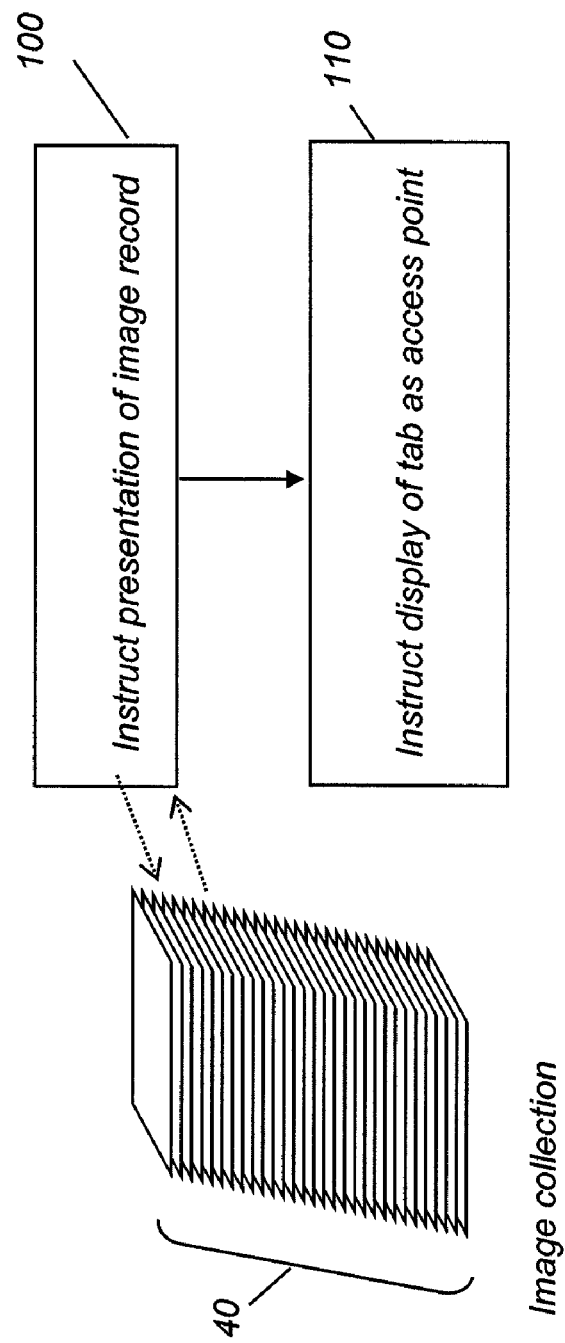
FIG. 2 is a block diagram of steps for providing access to information related to a digital image record.

The processor-accessible memory system 24 includes one or more processor-accessible memories configured to store information, including the information needed to execute the processes of the various embodiments of the present invention, including the example processes of FIG. 2 described herein. The processor-accessible memory system 24 may be a distributed processor-accessible memory system including multiple processor-accessible memories communicatively connected to the data processing system 26 via a plurality of computers and/or devices. On the other hand, the processor-accessible memory system 24 need not be a distributed processor-accessible memory system and, consequently, may include one or more processor-accessible memories located within a single data processor or device.

The phrase "processor-accessible memory," as used herein, includes any processor-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected," as used herein, includes any type of connection, whether wired or wireless, between devices, data processors, or programs in which data may be communicated. Further, the phrase "communicatively connected," as used herein, includes a connection between devices or programs within a single data processor, a connection between devices or programs located in different data processors, and a connection between devices not located in data processors at all. In this regard, although the processor-accessible memory system 24 is shown separately from the data processing system 26, one skilled in the art will appreciate that the processor-accessible memory system 24 may be stored completely or partially within the data processing system 26. Further in this regard, although the peripheral system 30 and the user interface system 28 are shown separately from the data processing system 26, one skilled in the art will appreciate that one or both of such systems may be stored completely or partially within the data processing system 26.

The peripheral system 30 may include one or more devices configured to provide digital image records to the data processing system 26. For example, the peripheral system 30 may include digital video cameras, cellular phones, regular digital cameras, or other computers. The data processing system 26, upon receipt of digital image records from a device in the peripheral system 30, may store such digital image records in the processor-accessible memory system 24.

The user interface system 28 may include a mouse, a keyboard, another computer, or any device or combination of devices from which data is input to the data processing system 26. In this regard, although the peripheral system 30 is shown separately from the user interface system 28, the peripheral system 30 may be included as part of the user interface system 28.

The user interface system 28 also includes a display device 10 and a processor-accessible memory, or any device or combination of devices to which data is output by the data processing system 26. In this regard, if the user interface system 28 includes a processor-accessible memory, such memory may be part of the processor-accessible memory system 24 even though the user interface system 28 and the processor-accessible memory system 24 are shown separately in FIG. 1.

Image records stored in a digital image-record collection in the processor-accessible memory system 24 may be linked to a variable amount of metadata. This image metadata can include various semantic and structural information related to the conditions under which the image was captured as well as information obtained about image contents. By way of illustration, metadata for a digital image record can include date and time of image capture, the capture location (provided by a Global Positioning Satellite, GPS, for example), camera owner, camera type, image resolution, comments from the operator or viewer of the image, and various data obtained from the image content itself, including information identifying the subject(s) of the image, and other information. Semantic information obtained and stored as metadata for a digital image record can include various information obtained from objects in the image, including data from image analysis tools known in the art, such as various software applications providing object recognition or face recognition, as noted previously.

Face detection algorithms are well known and have been described in, for example, U.S. Pat. No. 7,218,759 entitled "Face Detection in Digital Images" to Ho et al. and commonly assigned U.S. Pat. No. 7,110,575 entitled "Method for Locating Faces in Digital Color Images" to Chen et al. both of which are incorporated herein by reference. Face recognition algorithms, also known in the art, analyze identified face digital image records to assign an identity to one or more detected faces. For example, U.S. Pat. No. 7,142,697 entitled "Pose-Invariant Face Recognition System and Process" to Huang et al., which is incorporated herein by reference, describes the use of model digital image records as tools for training a neural network to recognize faces in digital image records.

Referring to FIG. 2, there is shown a logic flow diagram of a method for providing access to information related to a digital image record according to one embodiment of the present invention and using the overall system arrangement described with respect to FIG. 1. Data processing system 26 has access to a user collection of digital image records in processor-accessible memory system 24. Following the logic flow of FIG. 2, the user accesses an account having an image collection 40 that contains digital image records. In a presentation step 100, data processing system 26 provides an instruction to present a digital image record on a display that is part of user interface system 28. In a tab display step 110, data processing system 26 also instructs presentation of at least one tab on the display. The tab, which may have any of a number of forms, such as those described subsequently, displays or emanates near or from an edge of the displayed digital image record so that it is visually connected with the displayed image record and acts as an access point that is configured to allow the user to access a category of information that is related to content that is contained in or otherwise related to the digital image record.

The image content, and any relevant metadata associated with the image, is analyzed to determine image content that can indicate what might interest the user who is viewing the image. There are a number of techniques that can be used to analyze image content, as is familiar to those skilled in the image analysis arts. For example, various information about viewer interests can be obtained from metadata that is associated with a digital image record. This can include, for example, time stamp information, Global Positioning Satellite (GPS) information that tells the location at which the image was obtained, camera or other sensor type, owner of the image, and other related data. Additional semantic information can be obtained by an analysis of objects in the image. Objects that can be detected include people, animals, locations, various types of equipment, and other image features. These various items of information can be collected from the image and used to allow access to one or more categories of information that are related.

FIGS. 3A, 3B, 3C, 3D, and 3E show some examples of tabs 20 that emanate from edges of a displayed image 14 that appears on display 10. Image 14 appears within a rectangular area or similar container on the display. Tabs 20 shown in the examples of FIGS. 3A-3D have the familiar appearance of tabs such as those found on file folders and used in various graphical user interface (GUI) embodiments. It should be noted that the term "tab" can be more generally defined as an area or icon having a particular function in the interface for accepting user input and allowing a range of related functions. Tab 20 appears along or near an outer edge of image 14 so as not to obstruct the image view.

Figure 3A:
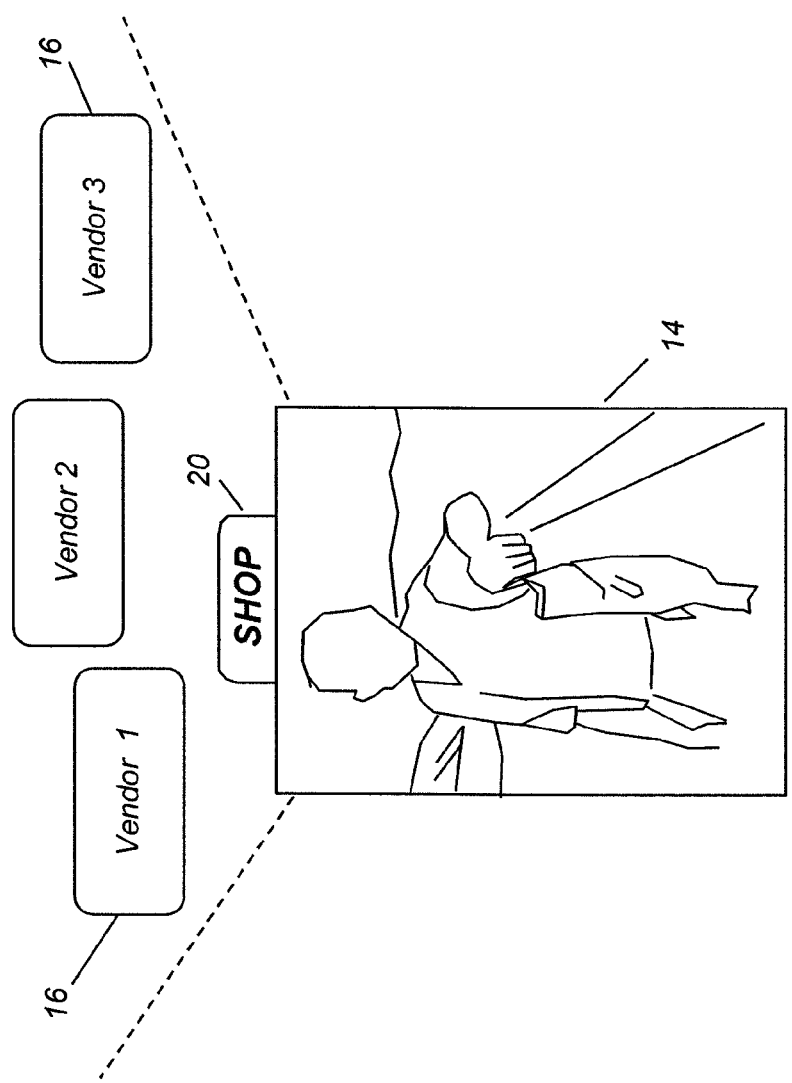

In the embodiment shown in FIG. 3A, tab 20 is labeled "SHOP" and acts as an access point for offering a number of options to the user for entering commands that relate to various product offerings. In the example shown, a young person proudly displays a fish. Other objects in the image include a lake or other body of water, a portion of a boat, and various information that suggests a vacation setting. This information can be used to provide shopping tab 20 with possible items of interest based on image content of the displayed image 14 for the purchase of boating equipment, fishing gear, outdoor equipment, and the like. Links to vendors who provide this equipment can be displayed as icons 16. These links can display with or without user interaction. In one embodiment, for example, link icons 16 display when the user mouse cursor or other pointer hovers over tab 20. Alternately, link icons 16 can be displayed when the cursor hovers over one or more objects within the image itself. For example, links to boating equipment may appear when the user places the mouse cursor over an image of a boat. Thus, link icons 16 could change dynamically when the same tab 20 displays. Alternately, clicking a mouse button or keyboard key can be used to provide tab 20 options.

Figure 3B:
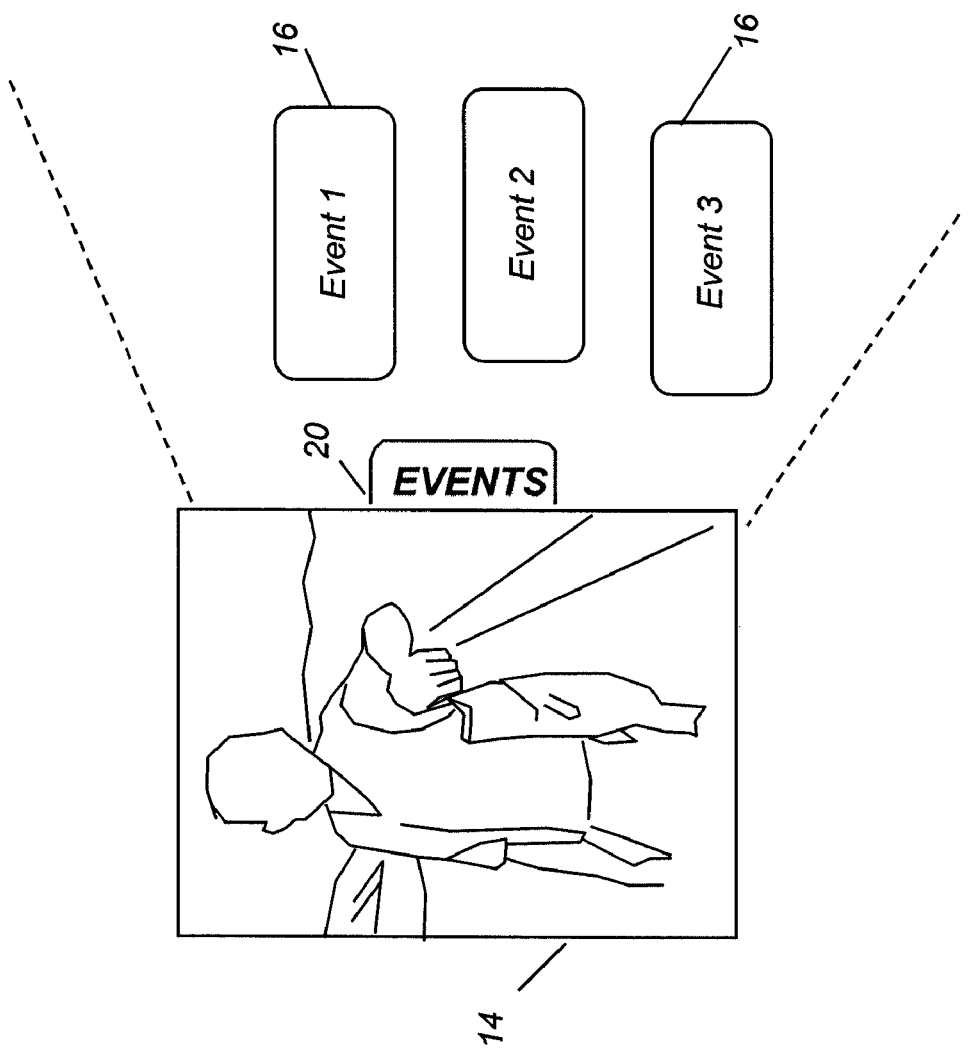

Product offerings are only one of a number of possible options available using the tab presentation of the present invention. FIG. 3B shows tab 20 providing link icons 16 to any of a number of events that might be of interest to the user, again related to digital image record content. In this example, "EVENT" tab 20 provides links to related events, such as fishing outings, as well as to related images in the user's digital image record collection. Related images could include other images with fish, boating, or outdoors activities, or other images from the same vacation or time frame. Where related images are presented, icon 16 can be presented in reduced-size or thumbnail form. Clicking on this icon would then display the selected image as image 14. As a part of this redisplay process, reconfiguration would be performed, so that image content is again accessed and appropriate tabs 20 displayed.

FIG. 3C shows a "PEOPLE" tab 20 that is directed to family or other social associations for the image content. This can include links to other family members, to other images of the same person, or links to friends or to others who have a similar interest, combining the detection of a number of objects in image 14, here, both the youngster and the fishing or outdoors interest.

FIG. 3D shows tab 20 directed to similar locations. "PLACE" tab 20 in this Figure can include links to fishing sites, camps, lakeshore resorts, tournament sites, and the like, again related to the image content.

Figure 3E:
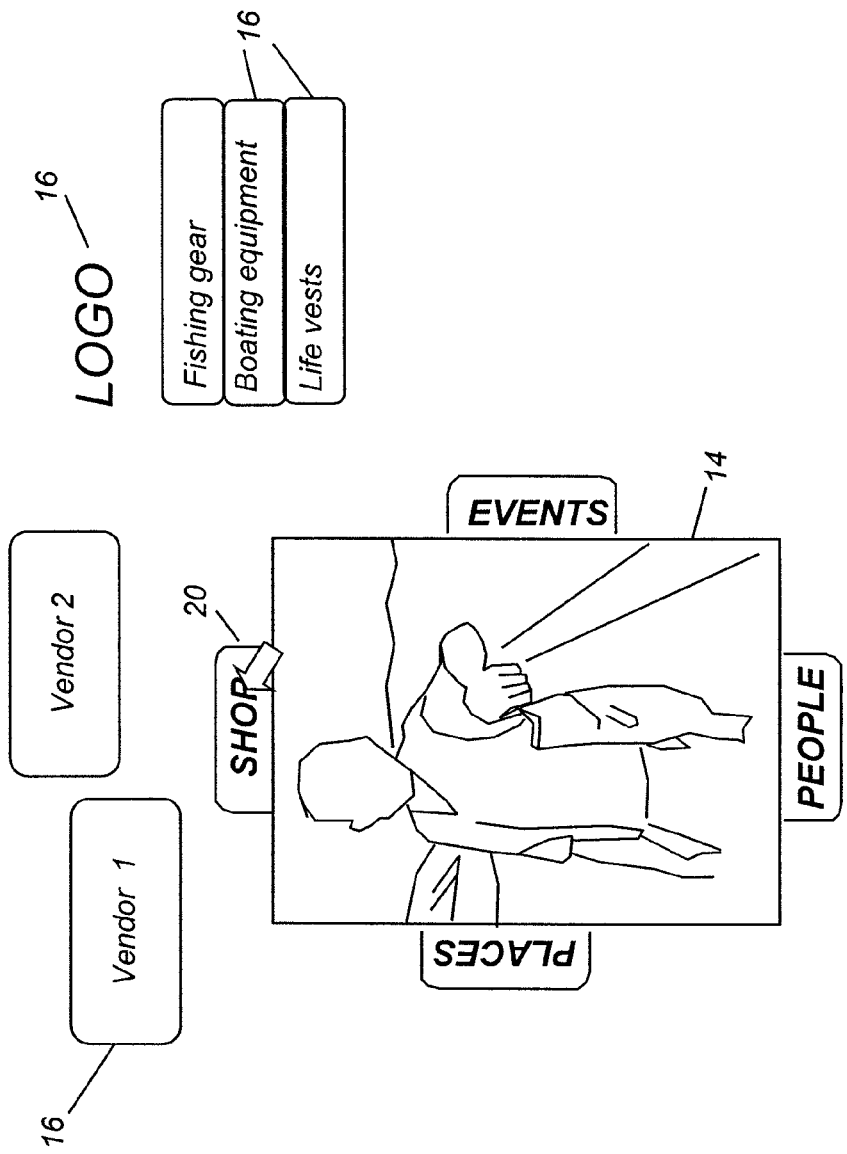

FIG. 3E shows an example in which a particular tab 20 becomes active when a cursor or other screen pointer hovers over or otherwise indicate the tab location. FIG. 3E also shows more specific locations for access to the web site for a particular vendor with additional icons 16.

It can be appreciated that any number of tabs 20 and link icons 16 can be provided for image content, actuated in any of a number of ways. Tabs 20 and link icons 16 can be labeled or include thumbnail images, animations, symbols, corporate or institutional logos, or other textual or pictorial content. Tabs 20 can be labeled with text, as shown in the examples of FIGS. 3A-3E, or could be labeled using symbols, animations, or other visual objects.

The types of information for any of the categories discussed above in relation to FIGS. 3A-3E may be organized in hierarchical layers. For example, with respect to shopping information discussed in relation to FIG. 3A, a first layer could be the "fishing department", the next layer could be "categories of products or brands", and the next layer could be specific products in those categories. One or multiple layers could be presented based upon the user's interaction with the tab 20.

Figure 4:
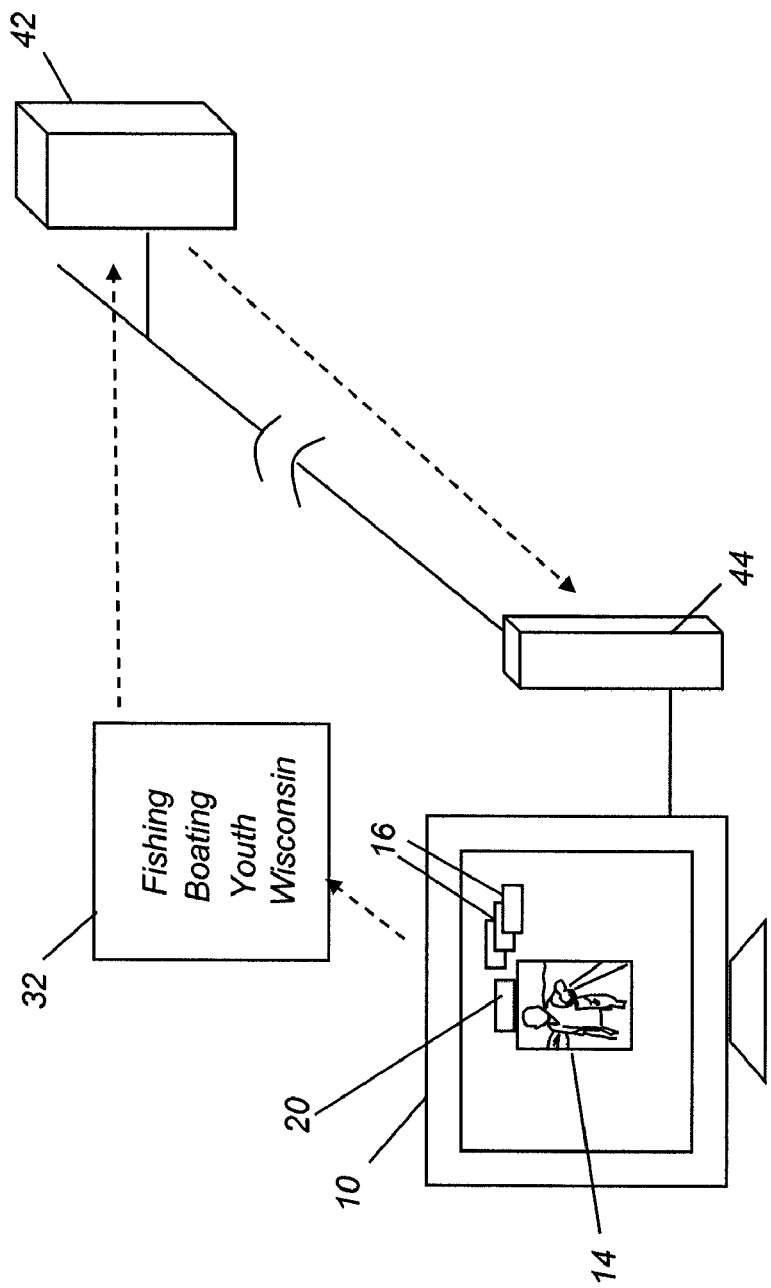
FIG. 4 is a schematic block diagram of a networked system for providing access to information that is related to image content.

FIG. 4 shows an embodiment in which a networked server 42 or other processor communicates with display 10, such as through a local processor 44. The user views image 14 from an image collection that is accessible to networked server 42, whether stored locally or at some other networked location. Server 42 communicates with local processor 44 to cause the digital image record to be displayed as image 14 on display 10. Then, image analysis utilities, executing on server 42 or on the local processor 44, for example, process the image and any associated metadata to identify any content that is of interest. FIG. 4 shows this content as a content record 32 that may take any of a number of forms. Information in content record 32 is then provided to server 42 and is used to identify one or more categories of information that may be of interest to the user who views image 14. This information can be matched with information available to an application on server 42 that maintains a registry of advertisers who offer products or services to users based on information gleaned from image content. Server 42 cooperates with processor 44 to cause one or more tabs 20 to be displayed, emanating from or near the edge of image 14 and provides the link icons 16 that allow the user to access other networked information, such as Internet sites or other digital record content.

Embodiments of the present invention allow content information related to the digital image record to be used as "feed-through" data, so that this information is available to a networked site along with the network address. For example, access to an Internet site may not obtain the main or "home" page, but may go more directly to vendor information that is pertinent to the identified content. In this way, the user can be directly presented an appropriate web page for fishing gear from the site of a large commercial outdoors outfitter who sells many other types of outdoor equipment. With this predisposed site entry, there would be no need for the user to navigate to an appropriate portion of the web site that is of interest, reducing the risk of user confusion or frustration at not being able to find the specific portion of a networked site that is of particular interest. The shopping information that is accessed thus has products or services more directly related to content within the digital image record that is being viewed.

Link icons 16 can also be configured to identify more specific parts of a web site or multiple parts of a site that might be of interest, as was shown in FIG. 3E. For the example of FIG. 3E, the user can be presented with multiple links to a large site, with various boating, fishing, and outdoor equipment categories presented for quick and easy user access.

The arrangement and appearance of tabs 20 can be made dynamic, so that different tabs 20 appear depending upon perceived user focus upon one or more objects in the displayed image 14. User focus can be ascertained by mouse position or hovering, mouse clicks, touch screen actuation, audible commands, motion sensing, amount of time spent viewing an image, or haptic sensors available at data processing system 26. A standard set of tabs 20 could be provided for each image, or tabs 20 could be displayed only where image content appears to relate to different categories of interest. For example, for an image containing only a sailboat, a tab related to people (such as that shown in the example of FIG. 3C) may not be appropriate, since there may be no available information related to people in the image. Tabs may alternately appear along or near any edge of the image within the image area.

The user can be provided with an option to display or to suppress tabs, or to show tabs 20 in a preferred format. Unused tabs 20 may disappear after a suitable timeout period or appear only at intervals, such as only after an image is viewed for 10 seconds or longer, for example. Or tabs 20 may be displayed only upon receipt of a suitable prompt from the user, such as a mouse click or hovering or touch screen actuation.

Where icons 16 indicate other image content, clicking on an icon, such as a thumbnail image, reconfigures or refreshes display 10 in some embodiments, so that the newly selected image now displays as image 14. The necessary image analysis and display of tabs 20 appropriate for that image content is also carried out along with the screen refresh operation.

User digital image record collection 40 (FIG. 2) may include a plurality of digital image records, which may be still or video images. Such digital image records may have been captured using various types of digital cameras or may have been scanned from conventional photographs and stored digitally. One of ordinary skill in the art will appreciate that the invention is not limited to the manner in which the digital image records were acquired. Digital image records in digital image record collection 40 may have accompanying metadata ranging from date/time stamp information to full-fledged data on imaging conditions, GPS location, type of capture device employed, image capture conditions, and the like.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

The invention has been described in detail with particular reference to certain preferred embodiments thereof, but it will be understood that variations and modifications can be effected within the spirit and scope of the invention.

The invention claimed is:

1. A method for providing access to information related to a digital image record on a data processing device, the method comprising the steps of:
   instructing presentation of the digital image record on a display;
   receiving an indication of user interaction with the displayed digital image record; and
   in response to the received indication, instructing presentation of a tab on the display, the tab emanating from an edge of the displayed digital image record or from an edge of a displayed digital image record container including the digital image record, wherein the tab comprises an access point configured to allow a user to access a category of information related to content contained within the digital image record, wherein the tab is labeled according to the category of information for user access; and
   wherein the category of information comprises shopping information associated with a particular product or service provider and indicates products or services related to the content contained within the digital image record and offered by the particular product or service provider.

2. The method of claim 1, wherein the content contained within the digital image record comprises metadata.

3. The method of claim 1, wherein the content contained within the digital image record comprises a portion of the displayed digital image record.

4. The method of claim 1, further comprising the step of instructing presentation of a second tab on the display, the second tab emanating from the edge of the displayed digital image record or from the edge of the displayed digital image record container including the digital image record, wherein the second tab comprises an access point configured to allow a user to access a second category of information related to content contained within the digital image record.

5. The method of claim 4, wherein the second category of information comprises event information relating to the content contained within the digital image record.

6. The method of claim 5, wherein the event information is associated with a particular activity, and the event information indicates performances or sporting events related to the content contained within the digital image record.

7. The method of claim 5, wherein the event information is hierarchically organized into layers, and wherein the method further comprises the step of instructing, upon receipt of an indication of user-interaction with the tab, presentation of at least one of the layers of event information.

8. The method of claim 7, wherein one of the layers of event information comprises a location related to the content contained within the digital image record.

9. The method of claim 5, wherein the content contained within the digital image record comprises an object represented by at least a portion of the digital image record, and wherein one of the layers of event information comprises an activity related to the object.

10. The method of claim 4, wherein the second category of information comprises event information relating to the content contained within the digital image record.

11. The method of claim 4, wherein the second category of information comprises personal information relating to the content contained within the digital image record.

12. The method of claim 11, wherein the personal information relates to an identity of an individual with an image captured within the digital image record.

13. The method of claim 11, wherein the personal information is hierarchically organized into layers, and wherein the method further comprises the step of instructing, upon receipt of an indication of user-interaction with the tab, presentation of at least one of the layers of event information.

14. The method of claim 13, wherein one of the layers of personal information comprises a family or other social association related to the content contained within the digital image record.

15. The method of claim 4, wherein the second category of information comprises similar image information relating to the content contained within the digital image record.

16. The method of claim 15, wherein the similar image information is hierarchically organized into layers, and wherein the method further comprises the step of instructing, upon receipt of an indication of user-interaction with the tab, presentation of at least one of the layers of similar image information.

17. The method of claim 16, wherein one of the layers of similar image information comprises an image related to the content contained within the digital image record.

18. The method of claim 4, further comprising the step of instructing presentation of a third tab on the display, the third tab emanating from the edge of the displayed digital image record or from the edge of the displayed digital image record container including the digital image record, wherein the third tab comprises an access point configured to allow a user to access a third category of information related to content contained within the digital image record.

19. The method of claim 1, further comprising the step of instructing the display of the image of a logo for a product or service provider on the tab in response to interaction with the tab, wherein the logo relates to shopping information.

20. The method of claim 1, wherein the user-interaction is a mouse hovering over the displayed digital image record.

21. The method of claim 1, wherein the shopping information is hierarchically organized into layers, and wherein the method further comprises the step of instructing, upon receipt of an indication of user-interaction with the tab, presentation of at least one of the layers of shopping information.

22. The method of claim 21, wherein one of the layers of shopping information comprises a product or service related to the content contained within the digital image record.

23. The method of claim 21, wherein the content contained within the digital image record comprises an object represented by at least a portion of the digital image record, and wherein one of the layers of shopping information comprises a product or service related to the object.

24. The method of claim 1, further comprising the step of instructing the display of the image of a logo for a host of an event on the tab in response to interaction with the tab, wherein the logo relates to information about the event.

25. The method of claim 1, wherein the user interaction comprises one of a mouse hovering, a mouse click, a physical touch of a touch-screen display, a point using a motion sensor, a remote control device, or a voice command.

26. The method of claim 1, further comprising the step of instructing the absence of the presentation of a tab on the display in response to a lack of information.

27. The method of claim 1, wherein the tab is configured based upon the content contained within the digital image record.

28. The method of claim 1, further comprising the step of receiving an indication of a mode switch, wherein the receiving step occurs prior to the instructing steps.

29. The method of claim 28, wherein the mode switch allows a user to toggle between passive browsing and active shopping.

30. A method for providing access to information related to a digital image record on a data processing device comprising:

presenting the digital image record on a display;
 receiving user interaction with the displayed digital image record; and
 in response to the received user interaction, presenting at least one tab on the display, the tab emanating from an edge of the displayed digital image record or from an edge of a displayed digital image record container including the digital image record, wherein the tab comprises an access point configured to allow a user to access a category of information related to content contained within the digital image record, wherein the tab is labeled according to the category of information for user access; and
 wherein the category of information comprises shopping information associated with a particular product or service provider, the shopping information indicating products or services related to the content contained within the digital image record and offered by the particular product or service provider.

31. An apparatus for providing access to information related to a digital image record on a data processing device comprising:

a data processing device that presents the digital image record on a display, receives user interaction with the displayed digital image record and in response to the received user interaction presents at least one tab emanating from an edge of the displayed digital image record or from an edge of a displayed digital image record container including the digital image record,
 wherein the tab comprises an access point configured to allow a user to access a category of information related to content contained within the digital image record, wherein the tab is labeled according to the category of information for user access; and
 wherein the category of information comprises shopping information associated with a particular product or service provider, the shopping information indicating products or services related to the content contained within the digital image record and offered by the particular product or service provider.

* * * * *